United States Patent Office 3,414,538
Patented Dec. 3, 1968

3,414,538
POLYOLEFINS STABILIZED WITH A
THREE-COMPONENT SYSTEM
Eberhard Prinz and Otto Mauz, Frankfurt am Main,
Germany, assignors to Farbwerke Hoechst Aktiengesellschaft vormals Meister Lucius & Brüning, Frankfurt am Main, Germany, a corporation of Germany
No Drawing. Filed Aug. 27, 1964, Ser. No. 392,610
Claims priority, application Germany, Sept. 5, 1963,
F 40,673
3 Claims. (Cl. 260—45.85)

ABSTRACT OF THE DISCLOSURE

Stabilization of polyolefins with phenol derivatives, aromatic amines, substituted aminophenols and organic sulfides; stabilization of polyolefins with a synergistic, three component mixture of a bisphenolalkanoic acid derivative, an organic phosphite and an aliphatic thioether.

---

The present invention relates to stabilized polyolefin compositions and to a process for preparing them. A number of compounds and classes of compounds are known for the stabilization of plastics against accelerated aging caused by oxygen, particularly at higher temperatures or in the presence of light. Thus phenol derivatives, aromatic amines, substituted aminophenols and organic sulfides have been found useful for the improvement of aging stability of polyolefins.

The effectiveness of some stabilizers can be considerably increased by simultaneous addition of representatives of other classes of stabilizers. Such "synergistic" systems are distinguished by the fact that their activity in most cases greatly exceeds the sum of the activities of the individual stabilizer components. Although in the course of time a great number of synergistic mixtures have become known, it still cannot be predicted in advance whether any given stabilizer mixture will exhibit synergism.

It is known from French Patent 1,306,942 that the esters of bisphenolalkanoic acid are more effective antioxidants for polyolefins than are most phenolic stabilizers. However, these compounds are disadvantageous in that they show a tendency toward discoloration at high temperatures, especially in the presence of oxygen. Therefore, up to now their use in light-colored mixtures has been restricted to relatively low concentrations, so that their effectiveness is still insufficient to stabilize polyolefins for all applications where they are subject to high temperatures for a prolonged period of time, for example hot water pipes.

In accordance with the present invention, it has been found that polyolefins can be stabilized very effectively against oxidation by the addition of 0.1 to 5% by weight preferably 0.4 to 2% by weight, based on the polyolefin, of a mixture of three components A, B and C, component A being a bisphenolalkanoic acid derivative of the general Formula 1

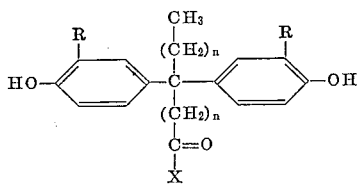

or 2

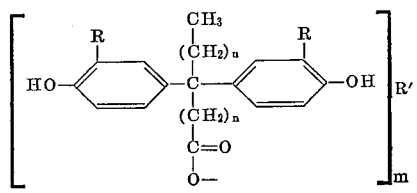

in which R is hydrogen, an aliphatic hydrocarbon radical with 1 to 18 carbon atoms or halogen, $n$ is an integer from 0 to 8, X is an alkoxy group having 1 to 18 carbon atoms, or an amino group selected from unsubstituted, partially substituted, or completely substituted amino groups; R' in Formula 2 is a straight chain or branched hydrocarbon radical with 2 to 12 carbon atoms which may also contain one or more free OH-groups; and $m$ is an integer from 2 to 6, component B being an organic phosphite of the general formula

in which $R_1$, $R_2$, and $R_3$ represent independently of each other aliphatic radicals with 8 to 18 carbon atoms, aromatic radicals, aralkyl radicals or alkaryl radicals, and component C being an aliphatic thioether of the general formula

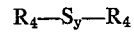

in which $R_4$ stands for an alkyl group with 8 to 20 carbon atoms or the grouping $—(CH_2)_x—COOR_5$, $R_5$ being an alkyl group with 8 to 20 carbon atoms, and $x$ an integer from 1 to 6, and $y$ stands for an integer from 1 to 3.

It has surprisingly been found that polyolefins which have been stabilized according to the invention have not only a lower tendency to discolor at higher temperatures but also show a considerable increase in the time to embrittlement at high temperatures than polyolefins stabilized in known manner. From this it can be seen that the stabilizer mixture of the invention has a high synergistic effect even though the phosphites alone show no stabilizing action.

It is known that phosphites improve the color quality of polyolefins, however the simultaneous considerable improvement of the stabilization is surprising as shown by the comparative tests using another conventional phenolic anti-oxidant instead of the phenolalkanoic acid ester.

Owing to the surprising high synergistic effect of bisphenolalkanoic acid esters, organic thioethers and organic phosphites mixtures of the said components represent stabilizer systems which are highly superior, as regards their activity as antioxidants for polyolefins, to similar stabilizer mixtures prepared with other phenolic components and which are at least equivalent to the latter as regards the color stability at high temperatures and in the presence of oxygen.

In the preceding Formulae 1 and 2 the aliphatic radical R may be e.g. the methyl, ethyl, propyl, t-butyl, isooctyl, isononyl, n- or isododecyl, or n-octadecyl group, or a halogen, preferably chlorine or bromine. X in Formula 1 may be an alkoxy group, such as the methoxy, ethoxy, propoxy, butoxy, t-butoxy, pentoxy, octoxy, dodecyloxy, or octadecyloxy group, or an amino group whose hydrogen atoms may be substituted partially or completely by e.g. methyl, ethyl, propyl, butyl, dodecyl, or octadecyl radicals. R' in Formula 2 represents preferably a divalent hydrocarbon radical, e.g. a methylene, ethylene, propylene, butylene, pentylene, hexylene, heptylene, octylene, nonylene, decylene, undecylene, dodecylene, tetradecylene, hexadecylene, or octadecylene radical. It can also be a multivalent hydrocarbon radical having a structure such as the following:

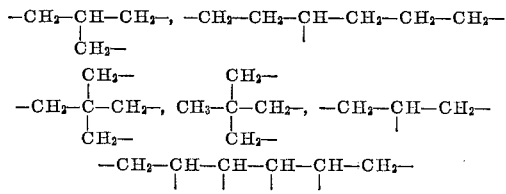

In the last mentioned radicals the free valences not occupied by bisphenolalkanoic acid radicals of Formula 2 may be occupied by free OH groups. Compounds of this kind are prepared by the partial or complete esterification of the bisphenolalkanoic acid with polyhydric alcohols, such as glycol, glycerine, 1,4-butane-diol, 1,2,3-butanetriol, trimethylolpropane, hexanetriol, pentaerythritol, hexitol and the like. The esters formed which correspond to the general Formula 2, may also contain partially free OH groups originating from the polyhydric alcohols, since the esterification need not take place at all hydroxyl groups. The ester-like compounds prepared in this way have a higher molecular weight and consequently a lower volatility than the corresponding compounds of lower molecular weight and are more compatible with the polyolefins to be stabilized.

Especially preferred esters of bisphenolalkanoic acid corresponding to Formula 1 which can be used as components of the stabilizer mixture according to the invention, include the following: the dodecyl and octadecyl esters of 3,3-bis-(4-hydroxyphenyl)-butyric acid, dodecyl and octadecyl esters of 3,3-bis-(4-hydroxy-3-methylphenyl)-butyric acid, dodecyl and octadecyl esters of 4,4-bis-(4-hydroxyphenyl)-valeric acid, dodecyl ester of 4,4-bis-(4-hydroxy-3-t-butylphenyl)-valeric acid, dodecyl ester of 4,4-bis-(4-hydroxy - 3-isooctylphenyl)-valeric acid, dodecyl ester of 3,3-bis-(4-hydroxy-3-t-butylphenyl)-butyric acid, dodecyl ester of 3,3-bis-(4-hydroxy-3-isooctylphenyl)-butyric acid, dodecyl ester of 3,3-bis-(4-hydroxy-3 - chlorophenyl)-butyric acid, and octadecyl ester of 4,4-bis-(4-hydroxy-3-bromophenyl)-valeric acid. Examples of compounds which correspond to Formula 2 include compounds of the following structures:

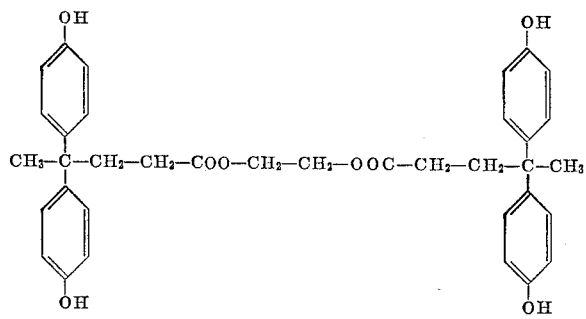

[Ester of glycol and 4,4-bis-(4-hydroxyphenyl)-valeric acid]

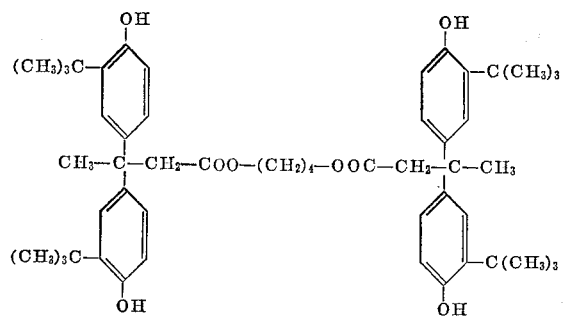

[Ester of 3,3-bis(4-hydroxy-3-t-butylphenyl)-butyric acid+1,4-butane diol].

The compounds of Formula 1 or of the free carboxylic acids corresponding to these compounds, can be prepared according to procedures known to the art by condensation of phenol or o-alkylphenols with keto-carboxylic acids or their esters in the presence of acid catalysts. Suitable phenols which can be used, for example, as starting products, include o-cresol-, 2-ethyl-, 2-propyl-, 2-isopropyl-, 2-t-butyl-, 2-isooctyl-, 2-isononyl-, 2-isododecyl-, 2-n-dodecyl-, 2-isooctadecyl-, and 2-n-octadecylphenol. Suitable keto-carboxylic acids, which, if necessary, are reacted in the form of their esters with the phenols, include pyroracemic acid, 3-keto-butyric acid, 4-keto-valeric acid, 5-keto-caproic acid, and acetoacetic acid (ester).

Suitable phosphites (component B) include: triphenyl phosphite, trioctyl phosphite, octyldiphenyl phosphite, tri-(nonylphenyl) phosphite, tridodecyl phosphite and the like.

Component C in the stabilizer mixture according to the invention is preferably an aliphatic thioether, above all a di- or tri-thioether compound, such as, for example:

thiodipropionic acid dilauryl ester,
dithiodipropionic acid dilauryl ester,
trithiodipropionic acid dilauryl ester,
distearyl disulfide and
distearyl trisulfide.

The ratio of the 3 components can be varied within wide limits within the indicated total stabilizer concentration. Components, A, B, and C are preferably used in a ratio of 1:1 to 10:1 to 10.

The stabilizer combinations of this invention are particularly effective at temperatures just below the crystallite melting point of the polymer to be stabilized. Thus the polyolefins stabilized according to the invention are particularly suitable for the preparation of molded articles which are to be exposed to high temperatures during their use in the presence of atmospheric oxygen. Important fields of application are, for example, hot water pipes and radiators or insulations and casings for electromotors. Polypropylene, for example, could not be used hitherto in such fields of application, in spite of its good thermal stability under load, owing to the high sensitiveness to oxidation at the required temperatures since the velocity of aging at said temperatures has been too high. The stabilization of the present invention opens up new fields of application, for example for polypropylene. The stabilized polyolefins have a very good processing stability.

The invention is especially suited for the stabilization of polyolefins containing tertiary carbon atoms. Preferable polyolefins of this kind are those which contain side chains due to the nature of the monomer, e.g. polypropylene and polybutene-1. High-pressure polyethylene and low-pressure polyethylene, which contain more or less longer or shorter side chains owing to secondary reactions, can also be stabilized in accordance with the invention. Polypropylene, which is the preferred compound to be stabilized according to the process of the invention, is prepared, as is low-pressure polyethylene, with the known Ziegler type low-pressure polymerization catalysts, which are described in Raff-Allison "Polyethylene" pp. 72–81, and elsewhere.

The stabilizers can be mixed with the polyolefins at the same time or different times and the mixing is done best by means of a highly concentrated stabilizer-polyolefin masterbatch. For this purpose a concentrated solution of the stabilizers in a low-boiling solvent, e.g. acetone or methylene chloride, is mixed with a small amount of a powder of the polymer to be stabilized in such a ratio that after evaporation of the solvent, the mixture contains about 30–40% stabilizer by weight.

This method of working furnishes a dry powder, which can be incorporated in the usual way into the polymer to be stabilized, in order to obtain the desired concentration of stabilizer in the finished mass. It is, of course, also possible to incorporate the stabilizers during the preparation of the polymer or during its work up. This method of working has the added advantage that the polymer is protected very early, i.e. during the preparation or processing, against the influence of light and atmospheric oxygen, especially at high temperatures. Polyolefins stabilized in this way can be treated by any of the known molding methods, e.g. compression, injection, and extrusion molding processes and the like.

The following examples serve to illustrate the invention but they are not intended to limit it thereto.

Examples

One hundred grams of polypropylene powder was mixed with 5% solutions of the stabilizer combinations listed in the following table, in such a quantitative ratio that the stabilizer concentration based on the polypropylene amounted to five times the quantity of the concentration given in the table. After drying at 80° C. under vacuum, to remove the solvent, the stabilized polypropylene powder was mixed thoroughly with 400 parts of unstabilized polypropylene powder, after which the mixture was granulated in a Battenfeld laboratory extruder at 200° C. The sample granulate was then molded in an Arburg injection molding apparatus at 275° C. to form test platelets of 1 mm. thickness.

Several test strips, each 10 mm. wide and 100 mm. long were punched out of each injection molded plate and suspended in an oven with air circulation for the determination of the resistance to oxidation. The oxidation resistance of the samples was determined by measuring the time to their embrittlement. The embrittlement time is the time in days, after which test strips, stored at 140° C. break upon bending 180° or show the beginning of a powdery decomposition.

The aging test under heat conducted in a drying oven with air circulation is considerably more precise because of the constant air circulation and fresh air supply, than when conducted in a standard drying oven without air circulation. The embrittlement times thus found are summarized in the table.

For the determination of the color values and color fastness 2½ mm. thick color sample platelets were injection molded under the same conditions as above and their yellowing values were measured in a differential colorimeter before and after 7 days of storage in a drying oven with air circulation at 140° C.

Table 1 summarizes the values found for the mixtures of 3 stabilizer components according to the invention in comparison with the vaules found for the individual stabilizers as well as the combination of 2 components of bisphenolalkanoic acid esters and thioethers.

Table 2 shows comparative results for corresponding mixtures containing a conventional phenolic antioxidant.

The tables clearly show the considerably improved stabilizing action of the mixtures according to the invention and the high synergistic effect.

TABLE 1

| Stabilizers | Concentration, percent by weight | Embrittlement time at 140° C., in days | Yellowing value Before | Yellowing value After 7 days storage at 140° C. |
|---|---|---|---|---|
| 3,3-bis-(4-hydroxy-3-methylphenyl)-butyric acid dodecyl ester | 0.1 | 45 | 1.2 | 23 |
| Plus thiodipropionic acid lauryl ester | 0.25 | | | |
| Plus octyldiphenyl phosphite | 0.5 | | | |
| 3,3-bis-(4-hydroxy-3-methylphenyl)-butyric acid dodecyl ester | 0.1 | 69 | 1.0 | 22 |
| Plus dithiodipropionic acid dilauryl ester | 0.25 | | | |
| Plus octyldiphenyl phosphite | 0.5 | | | |
| 4,4-bis-(4-hydroxyphenyl)-valeric acid dodecyl ester | 0.1 | 125 | 1.9 | 25 |
| Plus distearyl disulfide | 0.25 | | | |
| Plus octyldiphenyl phosphite | 0.5 | | | |
| 3,3-bis-(4-hydroxy-3-methylphenyl)-butyric acid dodecyl ester | 0.1 | 85 | 0.4 | 47.5 |
| Plus distearyl disulfide | 0.25 | | | |
| Plus triphenyl phosphite | 0.5 | | | |
| 4,4-bis-(4-hydroxyphenyl)-valeric acid dodecyl ester | 0.1 | 64 | 6.2 | 31 |
| Plus dithiodipropionic acid dilauryl ester | 0.25 | | | |
| Plus tri-(nonylphenyl) phosphite | 0.5 | | | |
| 4,4-bis-(4-hydroxyphenyl)-valeric acid dodecyl ester | 0.1 | 88 | 1.5 | 14.6 |
| Plus distearyl disulfide | 0.25 | | | |
| Plus tridodecyl phosphite | 0.5 | | | |

COMPARATIVE TESTS WITH THE INDIVIDUAL STABILIZER COMPONENTS

| Stabilizer | Concentration | Days | Before | After |
|---|---|---|---|---|
| 3,3-bis-(4-hydroxy-3-methylphenyl)-butyric acid dodecyl ester | 0.85 | 40 | 31.8 | 196 |
| 4,4-bis-(4-hydroxyphenyl)-valeric acid dodecyl ester | 0.85 | 48 | 40.2 | 185 |
| Octyldiphenyl phosphite | 0.5 | 1 | | |
| Triphenyl phosphite | 0.5 | 1 | | |
| Tridodecyl phosphite | 0.5 | 1 | | |
| Tri-(nonylphenyl) phosphite | 0.5 | 1 | | |
| Thiodipropionic acid dilauryl ester | 0.25 | 6 | | |
| Dithiodipropionic acid dilauryl ester | 0.25 | 10 | | |
| Distearyl disulfide | 0.25 | 11 | | |

COMPARATIVE TESTS WITH A COMBINATION OF BISPHENOLALKANOIC ACID ESTERS WITH THIOETHERS

| Stabilizer | Concentration | Days | Before | After |
|---|---|---|---|---|
| 3,3-bis-(4-hydroxy-3-methylphenyl)-butyric acid dodecyl ester | 0.1 | 34 | 6.4 | 90 |
| Plus thiodipropionic acid dilauryl ester | 0.25 | | | |
| 3,3-bis-(4-hydroxy-3-methylphenyl)-butyric acid dodecyl ester | 0.1 | 45 | 6.3 | 90 |
| Plus dithiodipropionic acid dilauryl ester | 0.25 | | | |
| 4,4-bis-(4-hydroxyphenyl)-valeric acid dodecyl ester | 0.1 | 66 | 6.6 | 83 |
| Plus distearyl disulfide | 0.25 | | | |

TABLE 2.—COMPARATIVE TABLE WITH A STABILIZER COMBINATION CONTAINING AS PHENOL DERIVATIVE 2,2-ISOPROPYLIDENE-BIS-P-NONYLPHENOL (CONDENSATION PRODUCT OF P-NONYLPHENOL AND ACETONE)

| Stabilizers | Concentration, percent by weight | Embrittlement time at 140° C., in days | Yellowing value | |
|---|---|---|---|---|
| | | | Before | After |
| | | | 7 days storage at 140° C. | |
| 2,2 isopropylidene-bis-p-nonylphenol | 0.1 | 25 | 2.5 | 45 |
| Plus thiodipropionic acid dilauryl ester | 0.25 | | | |
| 2,2-isopropylidene-bis-p-nonylphenol | 0.1 | 27 | 1.9 | 31.7 |
| Plus thiodipropionic acid dilauryl ester | 0.25 | | | |
| Plus octylidiphenyl phosphite | 0.5 | | | |
| 2,2-isopropylidene-bis-p-nonylphenol | 0.1 | 29 | 1.8 | 52 |
| Plus dithiodipropionic acid dilauryl ester | 0.25 | | | |
| 2,2-isopropylidene-bis-p-nonylphenol | 0.1 | 35 | 1.1 | 18 |
| Plus dithiodipropionic acid dilauryl ester | 0.25 | | | |
| Plus octylidiphenyl phosphite | 0.5 | | | |
| 2,2-isopropylidene-bis-p-nonylphenol | 0.1 | 32 | 2.0 | 33 |
| Plus distearyl disulfide | 0.25 | | | |
| 2,2-isopropylidene-bis-p-nonylphenol | 0.1 | 37 | 1.0 | 15 |
| Plus distearyl disulfide | 0.25 | | | |
| Plus octyldiphenyl phosphite | 0.2 | | | |

The synergistic action of the above-described stabilizer combination can be seen clearly from the values summarized in the table. The embrittlement time at 140° C. is considerably increased and the yellowing values are much better than with the use of bisphenolalkanoic acid esters alone. 2,2-isopropylidene-bis-p-nonylphenol, on the other hand, does not show this synergism.

We claim:
1. A composition comprising a mono-α-olefin polymer and 0.1 to 5% by weight, based on the polymer, of a three component stabilizer mixture consisting of components A, B and C, said component A being a bisphenol alkanoic acid derivative selected from the class consisting of compounds having the structural Formula 1

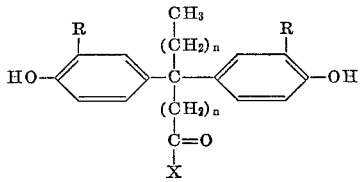

and compounds having the general Formula 2

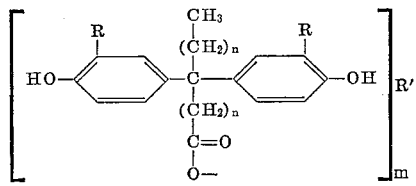

in which R is selected from the class consisting of hydrogen, aliphatic hydrocarbon radicals with 1 to 18 carbon atoms and halogen, $n$ is an integer from 0 to 8, X is selected from the class consisting of alkoxy groups with 1 to 18 carbon atoms or substituted or unsubstituted amino groups wherein the substituent is an alkyl group having 1 to 18 carbon atoms, and in which R' in Formula 2 is selected from the class consisting of straight chain and branched aliphatic radicals with 2 to 12 carbon atoms and straight chain and branched aliphatic hydrocarbon radicals with 2 to 12 carbon atoms still containing at least one free hydroxyl group, and $m$ is an integer from 2 to 6; said component B being an organic phosphite of the general formula

in which $R_1$, $R_2$ and $R_3$ represent independently of each other hydrocarbon radicals selected from the class consisting of aliphatic radicals with 8 to 18 carbon atoms, aromatic radicals, aralkyl radicals and alkaryl radicals; said component C being an aliphatic thioether of the general formula

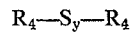

in which $R_4$ is selected from the class consisting of an alkyl radical with 8 to 20 carbon atoms and a radical of the formula $-(CH_2)_x-COOR_5$, $x$ being an integer from 1 to 6 and $R_5$ an alkyl radical with 8 to 20 carbon atoms, and $y$ is an integer from 1 to 3.

2. The composition of claim 1 where the stabilizing additive is a mixture of the dodecyl ester of 4,4-bis-(4-hydroxyphenyl)-valeric acid, octyldiphenyl phosphite and distearyl disulfide.

3. The composition of claim 2 where the polymer to be stabilized is polypropylene.

References Cited

UNITED STATES PATENTS 3,255,151    6/1966    Hecker et al. _____ 260—45.7

FOREIGN PATENTS 1,306,942    9/1962    France.
638,674      3/1962    Canada.

DONALD E. CZAJA, Primary Examiner.

V. P. HOKE, Assistant Examiner.